United States Patent [19]
Presz, Jr. et al.

[11] Patent Number: 4,830,315
[45] Date of Patent: May 16, 1989

[54] AIRFOIL-SHAPED BODY

[75] Inventors: Walter M. Presz, Jr., Wilbraham, Mass.; Robert W. Paterson, Simsbury; Michael J. Werle, Hartford, both of Conn.

[73] Assignee: United Technologies Corporation, Hartford, Conn.

[21] Appl. No.: 137,115

[22] Filed: Dec. 22, 1987

Related U.S. Application Data

[63] Continuation-in-part of Ser. No. 857,907, Apr. 30, 1986, abandoned.

[51] Int. Cl.$^4$ .............................................. B64C 3/10
[52] U.S. Cl. .................................. 244/200; 244/199; 244/130; 416/236 A; 114/103
[58] Field of Search ............... 244/130, 200, 198, 199, 244/204; 416/236 A; 114/103

[56] References Cited

U.S. PATENT DOCUMENTS

| | | | |
|---|---|---|---|
| 1,152,426 | 9/1915 | McCarroll . | |
| 1,366,635 | 1/1921 | Conway . | |
| 1,445,049 | 2/1923 | Stuart . | |
| 1,480,408 | 1/1924 | Miller . | |
| 1,773,280 | 8/1930 | Scott . | |
| 1,994,045 | 3/1935 | Nelson | 244/12 |
| 2,074,201 | 3/1937 | Bechereau . | |
| 2,238,749 | 4/1941 | Peltier | 170/159 |
| 2,272,358 | 2/1942 | Steinhaus | 170/172 |
| 2,664,700 | 1/1954 | Bendit | 60/35.54 |
| 2,800,291 | 7/1957 | Stephens | 244/41 |
| 2,962,101 | 2/1958 | Vaghi | 170/159 |
| 2,968,150 | 1/1961 | Goebel et al. | 60/35.55 |
| 3,060,681 | 10/1962 | Morley et al. | 60/35.6 |
| 3,072,368 | 1/1963 | Sedden et al. | 244/41 |
| 3,174,282 | 3/1965 | Harrison | 60/35.6 |
| 3,184,184 | 5/1965 | Dorman et al. | 244/41 |
| 3,481,531 | 3/1948 | MacArthur et al. | 230/134 |
| 3,521,837 | 7/1970 | Papst | 244/42 |
| 3,578,264 | 5/1971 | Kuethe | 244/41 |
| 3,588,005 | 6/1971 | Rethorst | 244/41 |
| 3,635,517 | 1/1972 | Wilfert et al. | 296/28 |
| 3,741,285 | 6/1973 | Kuethe | 165/1 |
| 3,776,363 | 12/1973 | Kuethe | 181/33 |
| 4,066,214 | 1/1978 | Johnson | 239/265.19 |
| 4,076,454 | 2/1978 | Wennerstrom | 415/208 |
| 4,257,640 | 3/1981 | Wiley | 296/1 |
| 4,284,302 | 8/1981 | Drews | 296/1 |
| 4,318,669 | 3/1982 | Wennerstrom | 415/119 |
| 4,343,506 | 8/1982 | Saltzman | 296/1 |
| 4,455,045 | 6/1984 | Wheeler | 296/1 |

FOREIGN PATENT DOCUMENTS

| | | |
|---|---|---|
| 822352 | 10/1951 | Fed. Rep. of Germany . |
| 845900 | 6/1952 | Fed. Rep. of Germany . |
| 794841 | 2/1936 | France . |
| 454600 | 1/1950 | Italy . |
| 111128 | 11/1917 | United Kingdom . |
| 463620 | 4/1937 | United Kingdom . |
| 791563 | 3/1958 | United Kingdom ............... 244/200 |
| 1375191 | 11/1974 | United Kingdom ............... 114/103 |

OTHER PUBLICATIONS

"Axisymmetric Bluff Body Drag Reduction through Geometrical Modification" by Howard and Doodman, *Journal of Aircraft*, vol. 22, #6, p. 516.

"Longitudinal Grooves for Bluff Body Drag Reduction" by Howard, Quass, Weinstein & Bushnell; AIAA Technical Note 81-4095, vol. 19, No. 4, Apr. 1981.

The Reduction of Drag by Corrugating Trailing Edges by Whitehead, Kodz & Hield, 1982, Cambridge University Engineering Dept.

Paper #73-654, "An Evaluation of Hypermixing for VSTOL Aircraft Augmentors", AIAA 6th Fluid and Plasma Dynamics Conf., (Jul. 16-18, 1970).

"Proceedings: Ejector Workshop for Aerospace Applications", University of Dayton Research Inst.; Dayton, Ohio, (Jun. 1982), AF Report AFWAL-TR-82-3059.

*Primary Examiner*—Galen Barefoot
*Attorney, Agent, or Firm*—Stephen E. Revis

[57] ABSTRACT

An airfoil-shaped body has a relatively thin trailing edge with a series of alternating, adjoining, downstream extending troughs and ridges in its suction surface which form wave-like surface undulations terminating at the trailing edge. The ridges in the suction surface form corresponding troughs in the pressure surface near the trailing edge; and the troughs in the suction surface form corresponding ridges near the trailing edge of the pressure surface. The resulting airfoil-shaped body has a trailing edge with a wave-like shape. The trough and ridge construction delays or prevents two-dimensional boundary layer separation without creating an undesirable drag penalty.

16 Claims, 7 Drawing Sheets

AIRFOIL-SHAPED BODY

REFERENCE TO RELATED APPLICATIONS

This application is a continuation-in-part application of U.S.Ser. No. 857,907 filed on Apr. 30, 1986 by Walter M. Presz, Jr. et al. titled Airfoil-Shaped Body now abandoned.

FIELD OF THE INVENTION

The present invention relates to airfoil-shaped bodies.

PRIOR ART

Drag is the result of skin friction and surface pressure variations induced by viscous effects, especially those due to separation bubbles or regions (i.e., low pressure wakes). Separation regions occur when two and three dimensional boundary layers depart from the surface of the body. Bluff or blunt bodies have shapes which tend to promote a rapidly increasing downstream pressure gradient in the streamline flow around it which can cause the bulk flow to break loose from the surface of the body. Airfoil shaped bodies such as airplane wings, rudders, sails, and gas turbine engine rotor blades and stator vanes have a streamlined shape which, at moderate angles of attack (below about 15°) avoid streamwise two-dimensional boundary layer separation over the entire surface. At higher angles of attack (or increased loading) separation does occur and a recirculating flow region (or a low pressure wake) is formed, greatly increasing drag and reducing lift. As used in the specification and appended claims, "streamwise, two-dimensional boundary layer separation" means the breaking loose of the bulk fluid from the surface of a body, resulting in flow near the wall moving in a direction opposite the bulk fluid flow direction.

It has been a constant goal of aerodynamicists to reduce the drag and improve lift and stall characteristics on bodies disposed in a fluid moving relative thereto. A common way to avoid boundary layer separation on an airfoil (or other streamlined body) or to at least delay separation such that it occurs as far downstream along the surface of the airfoil as possible so as to minimize drag, is to reduce the pressure rise downstream such as by tailoring the surface contour along the length of the airfoil in the direction of bulk fluid flow.

Another well known method for reducing the drag on airfoils is to create turbulence in the boundary layer so as to impart a greater average momentum of the boundary layer fluid, which carries it further downstream along the surface against an adverse pressure gradient, thereby delaying the separation point. One technique for increasing the momentum of the boundary layer is to generate streamwise vortices such as by using the ramp-type vortex generators shown in U.S. Pat. No. 2,800,291 to Stephens.

U.S. Pat. 4,455,045 to Wheeler describes elongated, expanding channels in the flow surface. The channels have sharp, lengthwise edges. The boundary layer on the surface flows into the channels, and the channel edges create streamwise vortices below the level of the normal flow surface which energize the flow in the channel to maintain boundary layer attachment of the flow along the floor of the channel.

In U.S. Pat. No. 1,773,280 to Scott, increased lift without increased drag is created for an aircraft wing by placing a plurality of side by side chordwise extending ridges along the top of the wing from its leading to its trailing edge, the ridges having their highest point near the thickest portion of the wing. The ridges themselves are airfoil shaped when viewed from above, tapering to a point at the trailing edge of the wing. This concept does not take into account viscous induced boundary layer separation effects and therefore could not be expected to avoid separation at high lift conditions.

U.S. Pat. No. 3,588,005 to Rethorst uses chordwise extending ridges in the upper surface of an airfoil to delay the onset of separation by providing "channels of accelerated flow in the free stream flow direction to add energy to the boundary layer and maintain laminar flow in the region of normally adverse pressure gradient." The ridges protrude from the surface "to a height of the order of the boundary layer thickness". Cross flow components "are accelerated over the ridges and may reduce the likelihood of separation near the aft end . . . of the body by allowing the flow to 'corkscrew' smoothly off the aft end rather than encounter the abrupt adverse pressure gradient in the free stream direction caused by a blunted aft end.' As with the ridges of the Scott patent discussed above, flow is also accelerated between the ridges which further helps maintain laminar flow over the airfoil surface.

U.S. Pats. No. 3,741,285 and 3,578,264 to Kuethe delay separation by creating vortices using a series of crests or concave depressions which extend substantially transverse to the streamwise flow direction. Kuethe states that the maximum height of a crest or depth of a depression is preferably less than the boundary layer thickness.

Figure 15:
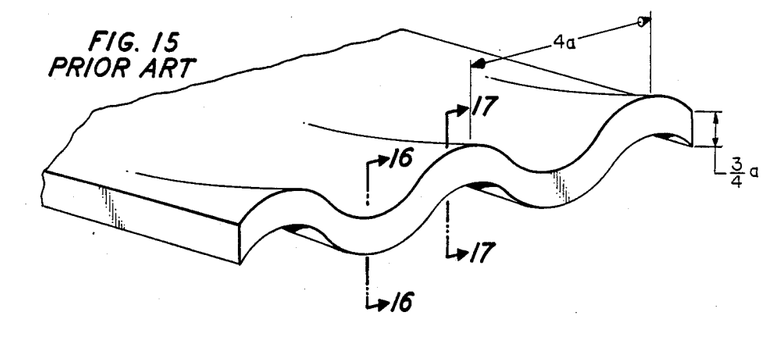
FIG. 15 is a perspective view of a "blade" in accordance with the prior art.
Figure 16:
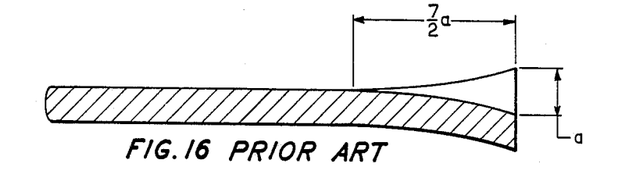
FIG. 16 is a cross-sectional view taken along the line 16—16 of prior art FIG. 15.
Figure 17:
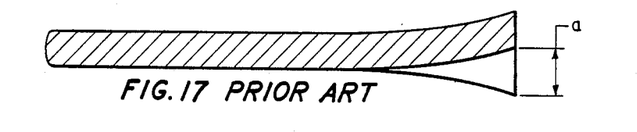
FIG. 17 is a cross-sectional view taken along the line 17—17 of prior art FIG. 15.

In a paper titled "The Reduction of Drag by Corrugating Trailing Edges" by D. L. Whitehead, M. Kodz, and P. M. Hield published by Cambridge University, England in 1982, blunt base drag of a blade (having a 20-inch span, 20 inch chord length, a constant thickness of 1.5 inches and a blunt trailing edge) is reduced by forming the last seven inches of its chordwise length into streamwise extending, alternating troughs and ridges (corrugations). The trailing edge and any upstream cross-section across the corrugations has the shape of a sine wave with an 8.0 inch wavelength. The thickness of the blade material is maintained constant over the length of each trough and ridge, although the trough depth or ridge height (i.e., wave amplitude) transitions from a maximum of 2.0 inches at the trailing edge to zero upstream. FIGS. 15-17 show the blade described therein, with dimensions given in terms of a unit length "a". A reduction of base drag of about one-third was realized when compared with a reference blade without corrugation. It is explained that spanwise vortices which were shed alternately from the top and bottom rear edges of the non-corrugated reference blade were eliminated by the corrugations. No mention is made in the paper of surface separation.

In general, it is believed that the separation delaying devices of the prior art create significant drag in their own right, thereby negating some of the benefits they would otherwise provide. This sometimes limits their effectiveness. While many of the devices of the prior art have proved to be effective in reducing drag and/or in permitting somewhat higher angles of attack before the onset of stall, further improvement is still desired. Even an additional reduction in drag of only 1%, or enabling an airfoil to operate without stalling at a relatively small increased angle of attack is considered valuable; yet, additional improvements of even small magnitude have been found to be very difficult to attain considering the present highly developed state of the art.

DISCLOSURE OF INVENTION

One object of the present invention is to reduce the drag on airfoil shaped bodies at high loading.

Another object of the present invention is to increase the lift capability of airfoil shaped bodies.

A further object of the present invention is to reduce the sensitivity of an airfoil-shaped body to stall onset under various operating conditions.

A more specific object of the present invention is to eliminate two-dimensional boundary layer separation on the surface of airfoil shaped bodies.

Yet another object of the present invention is an airfoil shaped body which can be operated at a higher angle of attack then conventional airfoil shaped bodies, without the occurrence of stall.

According to the present invention, an airfoil shaped body having a relatively thin trailing edge has a series of alternating, adjoining troughs and ridges in its suction surface extending in the direction of bulk fluid flow over the surface and forming wave-like surface undulations which terminate at the trailing edge. As the troughs approach the trailing edge they are deep enough to form corresponding ridges in the pressure surface. Similarly, the ridges in the suction surface result in corresponding troughs near the trailing edge of the pressure surface. Consequently, the trailing edge has a wave-like shape.

It is believed that the trough and ridge construction of the present invention delays or prevents the catastrophic effects of two-dimensional boundary layer separation by providing three-dimensional relief for the low momentum boundary layer flow. The local flow area variations created by the troughs and ridges produce local control of pressure gradients and allow the boundary layer approaching an adverse pressure gradient region to move laterally instead of separating from the wall surface. It is believed that as the boundary layer flows downstream and encounters a ridge, it thins out along the top of the ridge and picks up lateral momentum on either side of the peak of the ridge toward the troughs. In corresponding fashion, the boundary layer flowing into the trough is able to pick up lateral momentum and move laterally on the wall of the trough on either side thereof. The net result is the elimination of two-dimensional boundary layer separation because the boundary layer is able to run around the pressure rise as it moves toward the trailing edge. The entire scale of the mechanism is believed to be inviscid in nature and not tied directly to the scale of the boundary layer itself.

To have the desired effect of preventing or reducing streamwise two-dimensional boundary layer separation on the airfoil surface, it is believed that the sum of the depth and height of the troughs and ridges respectively, at the trailing edge (i.e., the peak-to-peak wave amplitude at the trailing edge) will need to be substantially greater than the 99% boundary layer thickness immediately forward of the upstream ends of the troughs. It is believed that best results are obtained when peak to peak amplitude at the trailing edge is comparable to the thickness of the separation bubble (or wake) which would be expected to occur at the trailing edge at a selected angle of attack for which the airfoil is designed, if the airfoil did not incorporate the troughs and ridges of the present invention. This will generally result in trough depth and ridge heights many times larger (often orders of magnitude larger) than the boundary layer thickness.

Not only must the peak-to-peak wave amplitude at the trailing edge be large relative to the boundary layer thickness, the slope of the bottoms or floors of the troughs relative to the bulk fluid flow adjacent the troughs (hereinafter the "trough slope") needs to be steep enough to generate the flow patterns and momentum transfer required to enable the boundary layer to overcome any increasing pressure gradient and thereby not separate from the surface. Only a few degrees of slope may be sufficient in some applications. In others, angles of 10°, 15° or more may be necessary. Note that the bulk fluid flow direction usually changes continuously along the length of the troughs. Thus, slope is unlikely to remain constant over the trough length. On the other hand, if the slope is too steep, the pressure gradient will increase too rapidly and two-dimensional boundary layer separation will occur within the troughs, defeating the purpose of the invention at least with respect to reducing drag on the surface of the body downstream of where separation ultimately occurs.

To prevent or at least delay streamwise two-dimensional boundary layer separation from occuring on the suction surface of an airfoil, which is the surface which typically has the separation problem due to its having a greater trailing edge region adverse pressure gradient then the pressure surface, the troughs and ridges must start upstream of where separation would otherwise be likely to occur at the angle of attack for which the airfoil is to operate. The trough depth and ridge height start at zero and increase toward the trailing edge to respective maximum dimensions.

The trough slope requirements coupled with the requirement of having the trailing edge peak-to-peak wave amplitude substantially greater than the 99% boundary layer thickness at the trough inlet will, for most practical applications, result in the troughs initiating at a point upstream of the trailing edge a distance no more than about 75% of the mean chord length of the airfoil. For thin airfoils (i.e., airfoils having a maximum thickness less than 10% of the mean chord length) such as are used in compressors and fans of gas turbine engines the troughs will almost always initiate at a point upstream of the trailing edge a distance no more than 50% of the mean chord length (i.e., generally the troughs and ridges will be disposed only in the trailing edge region). In this connection it is also undesirable to start a trough so far upstream that the flow on the surface is still accelerating since it provides no benefits and simply increases the wetted surface area and thus skin friction drag.

The present invention may be distinguished from U.S. Pat. No. 3,588,005 to Rethorst by the fact that Rethorst uses only ridges and these have a maximum height which is only approximately the laminar boundary layer thickness. The Rethorst mechanism involves lateral flow of the laminar boundary layers over the ridges themselves, i.e. it involves energizing laminar boundary layer only by local acceleration of that boundary layer as it proceeds over the top of the ridges. Note that Rethorst indicates his invention will work with ridges oriented normal to the streamwise flow direction, further indicating that the mechanism involved therein is the energizing of the boundary layer by having it flow over the ridges. This is similar in nature to the device described in U.S. Pat. No.

3,578,264 to Kuethe wherein crests or depressions which are only the height of the boundary layer are oriented generally normal to the flow and simply energize the boundary layer by creating vortices which transfer their energy to the boundary layer. Other types of vortex generators which are well known in the prior art operate on the principal of transferring energy from the free stream into the frictionally decelerated boundary layer, thereby providing energy to aid the flow in overcoming the adverse pressure gradient. Unfortunately, vortex generators of the type which protrude into the fluid stream create their own drag which detracts from their effectiveness. Thus, while such vortex generators may create axial vortices in the boundary layer and delay or eliminate separation and may increase lift, they simultaneously create an undesirable drag penalty of their own which offsets some of their benefits.

The primary effect of the present invention is to provide a path for the boundary layer to skirt around the adverse pressure gradient itself. It does not require an identifiable vortex structure in the trough or on the ridges of the body. Neither does it require net flow over the ridges. As such the present invention is useful in preventing boundary layer separation for either turbulent or laminar flows.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
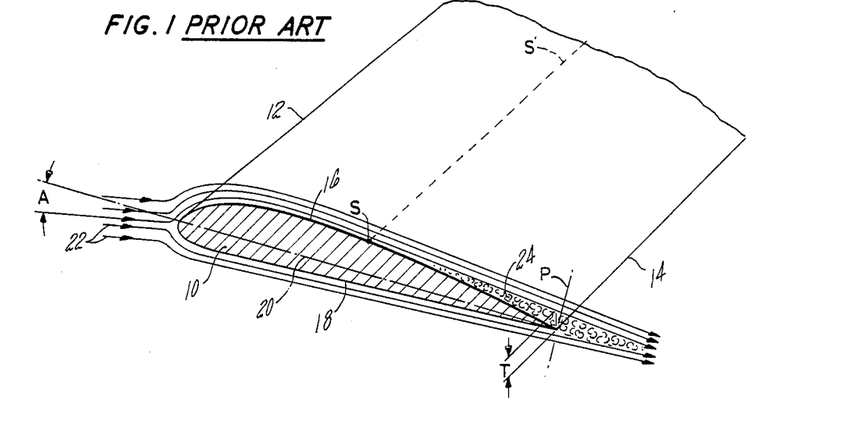
FIG. 1 is a prior art airfoil which is shown for the purpose of defining and explaining terms used in the application.

FIG. 1 is illustrative of the flow field around an airfoil shaped body 10 of the prior art which is oriented at an angle of attack great enough to result in two-dimensional boundary layer separation from the surface of the airfoil. For purposes of understanding the terminology used throughout the present application, the airfoil shaped body 10 includes a leading edge 12, a thin trailing edge 14, a suction surface 16, and a pressure surface 18. The airfoil cross section has a mean chord line 20. Fluid stream lines are represented by the reference numeral 22 and show the direction of bulk fluid flow relative to the surface of the body 10. The angle of attack of the body is designated by the reference letter A.

As used throughout this specification and claims, the phrase "airfoil shaped body" means a body which is considered to have an airfoil shape in cross section (i.e. a generally streamlined cross sectional shape). An airfoil shaped body having a "thin trailing edge" is a body whose trailing edge is so thin it does not, in and of itself, create significant base drag.

In the illustration of FIG. 1, the angle of attack is such as to produce high loading and cause the fluid stream lines to separate from the suction surface 16 at a point S at the cross section shown. The points S taken along a series of cross sections define a separation line S' along the suction surface of the airfoil. A separation region (or wake 24) is created downstream of the separation line S' which creates drag on the airfoil. The further upstream the separation line is located, the greater the drag on the airfoil and the lower the lift. For purposes which will become clear hereinafter, the thickness T of a separation region (or wake) is defined as the distance from the trailing edge to the outer edge of the separation region as measured in a plane P passing through the trailing edge and perpendicular to the airfoil mean chord line at the trailing edge.

With reference to FIGS. 2-5, a wing 30 according to the present invention has an airfoil shaped cross section. In this embodiment the wing 30 has a plurality of alternating troughs 32 and ridges 34 in the upper suction surface 36; and a plurality of alternating troughs 38 and ridges 40 in its lower pressure surface 42. Each trough 32, 38 has a pair of opposed sidewalls 43, 45, respectively. The troughs 32, 38 and the ridges 34, 40 extend generally along the expected streamlines of the bulk fluid flow over the wing in the vicinity of each ridge and trough.

Figure 2:
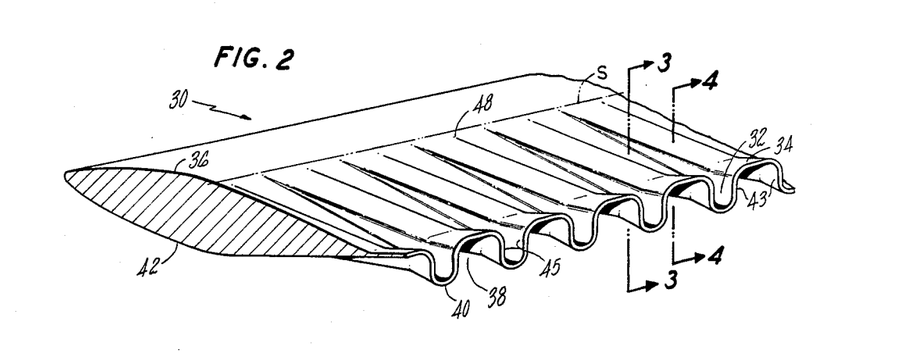
FIG. 2 is an illustrative, perspective view of an airfoil incorporating the present invention.
Figures 2A, 3:
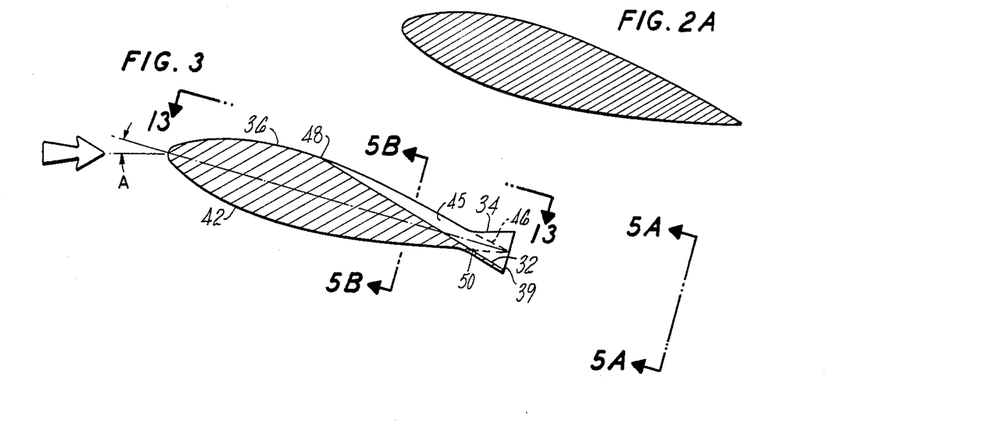
FIG. 2a is a view representing a cross section of the airfoil of FIG. 2, but without the troughs and ridges formed therein.
FIG. 3 is a sectional view taken along the line 3—3 of FIG. 2.
Figure 4:
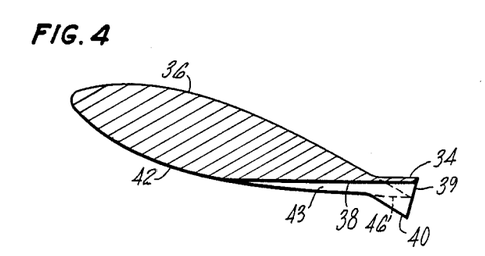
FIG. 4 is a sectional view taken along the line 4—4 of FIG. 2.

FIG. 2A, shows what the airfoil cross section would be without the troughs and ridges. This is hereafter referred to as the 'nominal' airfoil cross section. Assuming the wing 30 had a constant cross section identical to the nominal cross section, a separation line S' for any preselected angle of attack may be determined. To avoid separation, the upstream ends of the troughs 32 and ridges 34 must necessarily be located upstream of this separation line for that angle of attack. Such troughs and ridges then extend to the trailing edge of the airfoil.

If boundary layer separation is not a problem on the pressure surface of the airfoil, the length of the troughs and ridges in the pressure surface is not critical, other than to assure that the troughs flow full. FIG. 3 is a cross section taken through the wing 30 along the bottom of a trough 32. The outline of the nominal airfoil cross-section is superimposed over cross section as a phantom line 46. As can be seen in FIG. 3, the trough depth increases from zero at its upstream end 48 to a maximum depth at the trailing edge 39 of the airfoil. Since the thickness of the nominal airfoil cross section decreases toward the trailing edge, the trough surface eventually falls below the location of the nominal pressure surface of the airfoil, such as at 50. A further extension of the trough downstream of the point 50 necessarily requires the formation of one of the ridges 40 in the lower pressure surface of the airfoil. Similarly, each ridge 34 is disposed above the upper suction surface of the nominal airfoil shape 46. In order that the airfoil trailing edge 39 remains thin, a corresponding trough 38 must be formed in the lower pressure surface of the airfoil. The trailing edge 39 of the airfoil therefore takes on a wave shape. From FIGS. 3 and 4 it is seen that, in this embodiment, the airfoil thickness decreases toward the trailing edge over the length of the troughs and ridges; and the peaks of the ridges in both the suction and pressure surface follow the nominal airfoil cross-sectional shape almost to the trailing edge.

Figure 13:
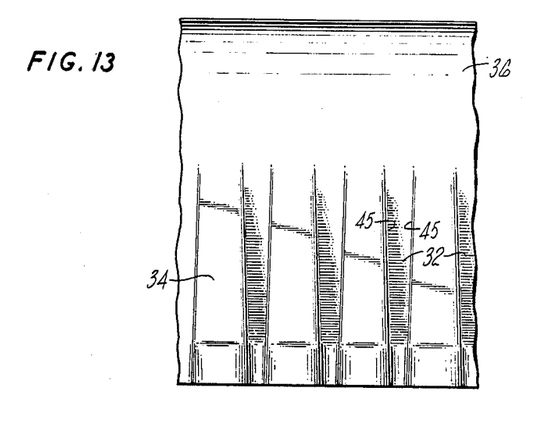
FIG. 13 is a view of the suction surface of the wing of FIG. 2, taken along the line 13—13 of FIG. 3.

As shown in FIG. 13, the sidewalls 45 of the troughs in the suction surface decrease toward the trailing edge to create convergent passages. The convergent passages have an accelerating effect on the flow within the troughs. The acceleration of the bulk fluid flow within converging troughs is believed to add momentum to the boundary layer, although the advantages would be only secondary to those provided by the existence of the troughs and ridges themselves. Also, converging troughs in the suction surface decrease the suction surface pressures, may tend to increase lift. In view of these benefits, converging suction surface troughs are preferred, but not required.

Since the troughs and ridges in both the pressure and suction surfaces virtually meet near the trailing edge to form the wave-like shape of the trailing edge, it follows that the converging troughs in the suction surface will necessarily result in diverging trough portions in the pressure surface, thereby increasing pressure. The increased pressure may also increase lift.

Figure 5A:
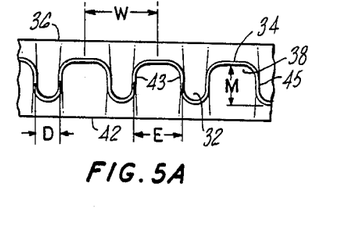
FIG. 5a is an end view of the airfoil of FIG. 2 generally in the direction of the line 5a—5a of FIG. 3.
Figure 5B:
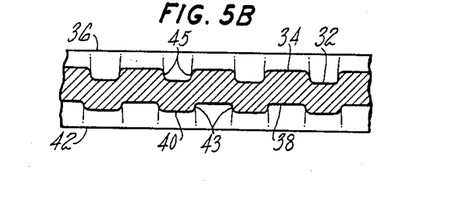
FIG. 5b is a sectional view of the airfoil of FIG. 2 taken along the line 5b—5b of FIG. 3.

In this embodiment the troughs and ridges are U-shaped at any cross section taken perpendicular to their length, and they blend with each other (i.e. no sharp edges) so that the airfoil surface is a series of relatively smooth undulations which minimize the formation of drag producing axial vortices. The shape and contour of the ridges and troughs along their length are preferably selected to assure that two-dimensional boundary layer separation does not occur anywhere on the surface, such that the troughs Further with respect to the trough sidewalls 43, 45 it is preferred that, within a trough, they be parallel to each other, as shown in the drawing of FIGS. 2, 5A and 5B; however, beneficial results may also be obtained when the sidewalls diverge from the trough bottom to form an included angle of up to 120° flow full along their entire length. For the same reason the rate of increase in trough depth and the rate of increase in ridge height cannot be excessive. Optimizing the size and shape of the troughs and ridges may have to be done by trial and error, and will depend, for example, on the desired operating angle of attack and the nominal airfoil cross-sectional shape. In some cases amplitude M (FIG. 5a) at the trailing edge of only about one and one half or twice the 99% boundary layer thickness (measured immediately upstream of the upstream ends of the troughs) may be sufficient. It is believed that best results will be obtained when the amplitude M at the trailing edge is at least the same as and most preferably about twice the maximum thickness T of the separation region which would have formed at the selected operating angle of attack for the same body having the nominal airfoil cross section over its entire length. An amplitude M which is too small may result in delaying the onset of separation, without preventing it completely. The present invention is intended to encompass any amplitude which provides beneficial results.

If it is not practical or possible to determine a "nominal airfoil cross section", a close approximation to the amplitude criterion set forth above is to make the amplitude M at the trailing edge at least the same as and most preferably about twice what the thickness of the separation region would have been had separation occurred on the suction surface about at the upstream ends of the troughs.

If W is the distance between the peaks of adjacent ridges at the trailing edge (i.e. the "wavelength" at the trailing edge), the ratio of W to M is preferably no greater than about 4.0 and no less than about 0.5, in order to induce sufficient lateral pressure gradients without encountering significant viscous losses.

In cases where separation from the pressure side of the airfoil is not a problem, the troughs and ridges should be designed to best deal with the separation on the suction surface, with the shape and size of the pressure surface troughs and ridges being more or less dictated by what is needed in the suction surface. It may also be desirable, in certain circumstances, to have substantially identically shaped and sized ridges and troughs in both the upper and lower surface of the airfoil. Furthermore, there may be practical reasons, such as manufacturing considerations and structural requirements, that dictate the use of a size, shape and length of trough and ridge which is not optimum, but which is highly beneficial. In such instances the troughs may not flow full over their entire length, but will at least delay the onset of separation.

Wind tunnel tests were run on two airfoils, one being an NACA 65 series, 21% thick airfoil of standard shape, and the other being an identical airfoil modified in accordance with the teachings of the present invention. The modified airfoil had an appearance similar to that of the airfoil shown in FIG. 2. Both the modified and unmodified airfoil had a chord length of 3.0 inches and a span or transverse length of 9.0 inches, and a trailing thickness of 0.03 inch. The troughs and ridges had their upstream ends located 1.78 inches from the trailing edge, which was near the location of the thickest (0.63 inch) area of the airfoil cross section. At the trailing edge the wavelength W was 0.624 inch; the trough width D (FIG. 5a) in the suction surface was 0.178 inch; the trough width E in the presence surface was 0.386 inch; and the amplitude M was 0.312 inch. The suction surface troughs converged from a width of 0.282 inch at their upstream ends, to 0.178 inch at the trailing end. The pressure surface troughs diverged from 0.282 inch to 0.386. In this example the trough slope or angle between the trough floor and the adjacent bulk fluid flow direction was generally less than 5° except near the trailing edge where it increased considerably to almost 15°.

Figure 6:
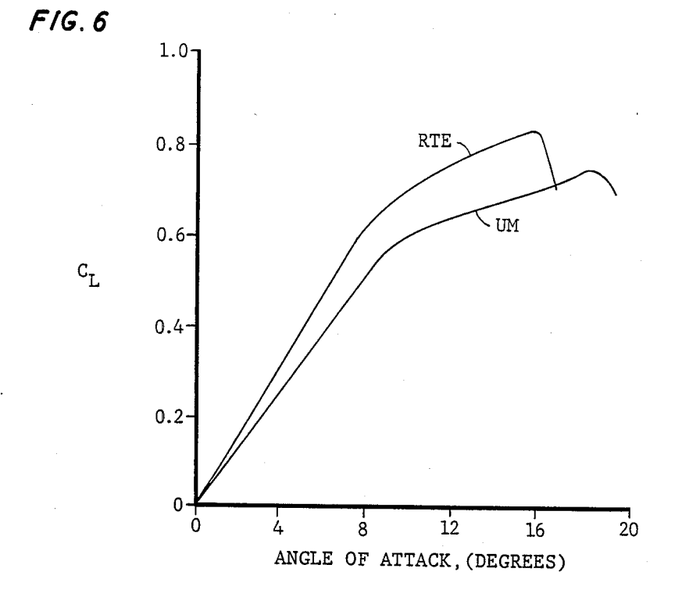
FIG. 6 is a graph including a lift coefficient curve for an airfoil similar to the one shown in FIG. 2, for various angles of attack, including a similar curve for the same airfoil without the present invention, for purposes of comparison.

The lift curves for the test airfoils are shown in FIG. 6. The lift curves are plots of lift coefficients $C_L$ at various angles of attack "A". The curve for the unmodified airfoil is labelled UM. The curve for the airfoil modified in accordance with the present invention is labelled RTE, which stands for "Rippled Trailing Edge". It can be seen that greater lift occurred at all angles of attack for the RTE airfoil; and the RTE airfoil achieved about 15% greater lift before stall.

Figure 7:
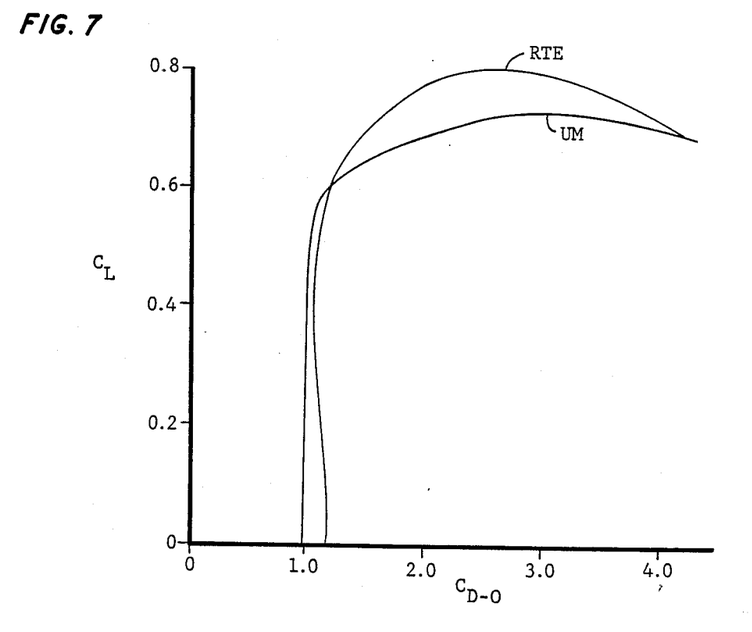
FIG. 7 is a graph showing the relationship between the coefficient of lift and coefficient of drag for an airfoil similar to the airfoil shown in FIG. 2, including a curve showing such a relationship for the same airfoil without the present invention, for purposes of comparison.

FIG. 7 shows the drag polar curves for these tests, which is a plot of lift coefficient $C_L$ vs. the drag coefficient normalized to the unmodified airfoil's zero lift drag ($C_{D-O}$ in the graph). Although there is slightly increased drag for low lift conditions, the RTE airfoil demonstrated considerably increased lift for fixed drag under high lift conditions.

Figure 8:
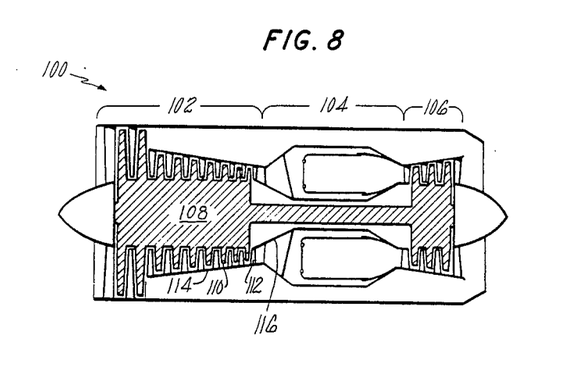
FIG. 8 is a schematic representation of a gas turbine engine incorporating stator vanes and rotor blades constructed in accordance with the teachings of the present invention.

FIGS. 8-12 show other applications for the present invention. In FIG. 8, a gas turbine engine 100 is shown schematically as including, in series, a compressor section 102, a burner section 104, and a turbine section 106. The compressor section 102 includes a rotor stage 108 comprising a plurality of circumferentially spaced apart rotor blades 110, which are airfoils. The blades 110 extend across the gas flow path. The blade tips pass very close to the outer flow path wall. The rotor 108 is followed by a stage of stationary, circumferentially spaced apart stator vanes 112. The vanes 112 are attached at their inner ends to an inner engine casing 116, and at their outer ends to an outer engine casing 114.

Figure 9:
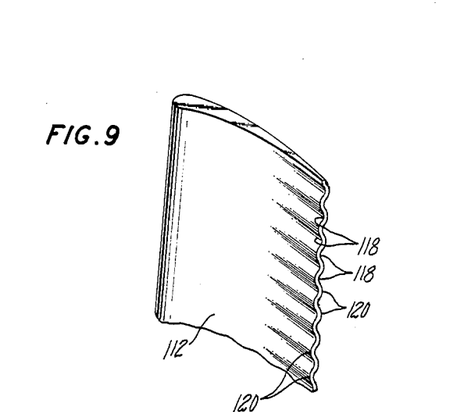
FIG. 9 is an enlarged view of the stator vane shown in FIG. 8.
Figure 10:
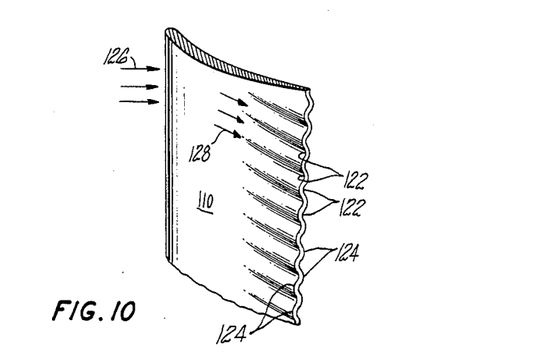
FIG. 10 is an enlarged view of the rotor blade shown in FIG. 8.

Both the rotor and stator airfoils incorporate the rippled trailing edge of the present invention, as more specifically shown in FIGS. 9 and 10. Although not shown, the present invention may also be applied to turbine rotor and stator airfoils.

Referring to FIG. 9, both the pressure and suction surface of the vane 112 includes a plurality of alternating troughs 118 and ridges 120 extending over the trailing edge region, defining undulating surfaces on both the pressure and suction sides in the trailing edge region. In thin airfoils such as used in gas turbine engine compressors the troughs and ridges would not cover more than 50% of the mean chord length of the airfoil. One point of distinction between the wing 30 and the vane 112 is that the pressure side of the vane is concave in the trailing edge region rather than convex. The present invention is equally applicable to either type of airfoil section, and even to a flat surfaced airfoil having a thin trailing edge.

As best shown in FIG. 10, each rotor blade 110 also has a plurality of alternating troughs 122 and ridges 124 in both the pressure and suction surfaces of the blade to form a relatively thin, wave-shaped trailing edge. For illustration purposes, assume that the working fluid approaches the rotor blade 110 in the direction represented by the arrows 126. Blade rotation imparts a radial component to the air as it moves downstream over the surface of the blade. By the time the fluid reaches the trailing edge region it may be moving, (relative to the blade 110) in the direction of the arrows 128, which represent the direction of bulk fluid flow at the location of the arrows. In accordance with the present invention, it is preferred to orient the troughs and ridges generally parallel to such bulk fluid flow direction in the trailing edge region.

Figures 11, 12:
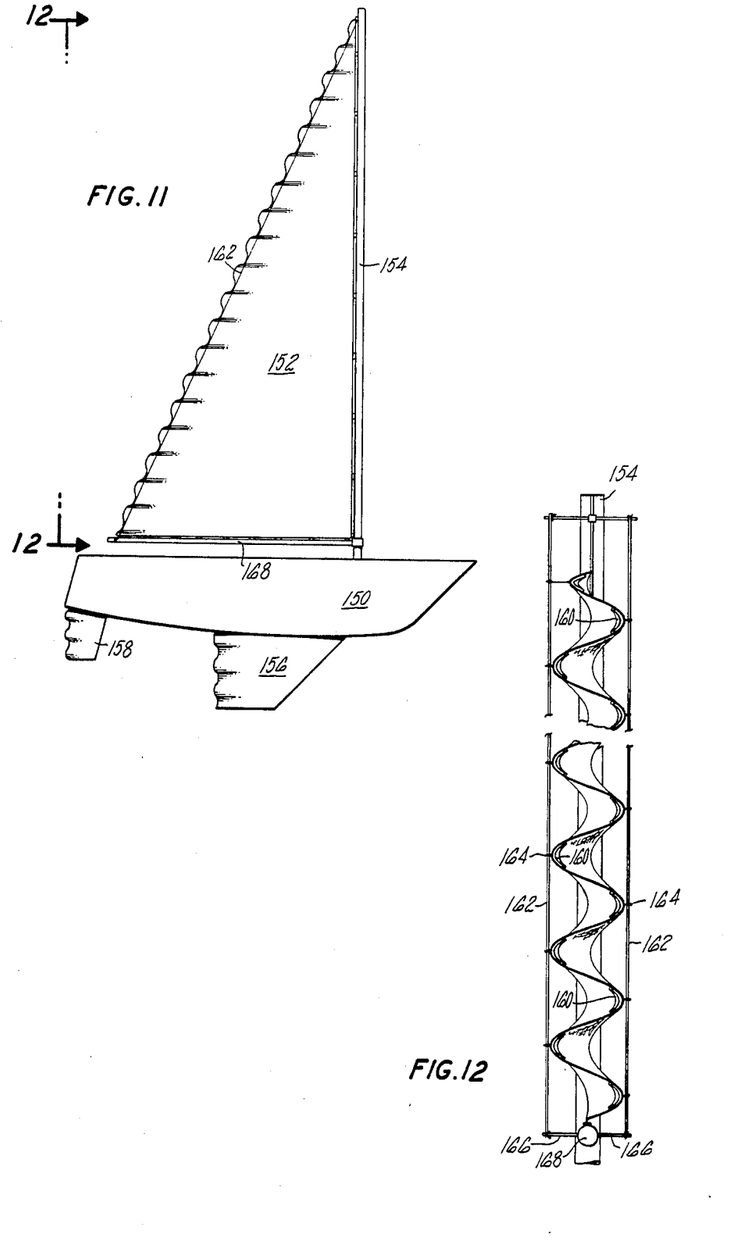
FIG. 11 is a simplified, illustrative perspective view of a sailboat having a sail, keel, and rudder all incorporating the features of the present invention.
FIG. 12 is a view of the trailing edge of the sail of FIG. 11 taken generally in the direction 12—12 of FIG. 11.

With reference to FIG. 11, a sailboat is shown incorporating the present invention in several different locations, all for the primary purpose of reducing drag resulting from boundary layer separation. The sailboat comprises a hull 150, a sail 152 of non-self-supporting sail material attached to a mast 154, a keel 156 and a rudder 158. The sail, keel and rudder all incorporate the present invention. Thus, the rudder and keel have airfoil cross sections and have troughs and ridges formed in their thin trailing edge regions to delay boundary layer separation from the surfaces thereof as the boat travels through the water.

With reference to FIG. 12, the sail 152 has local, curved reinforcements 160 along the trailing edge to create a series of smooth curves in alternate directions along the trailing edge (i.e. a wave-shape). Ropes 162 pass through eyelets 164 at the ridge peaks created by the reinforcements along each side of the sail, and are connected to the top of the mast and to lateral extensions 166 of the boom 168. By forcing the trailing edge to take on a wave shape, a plurality of alternating troughs and ridges in both sides of the sail will be formed along a region of the sail immediately upstream of and including the trailing edge. It is expected that the ridges and troughs formed in the trailing edge region of the sail will at least partially alleviate trailing edge separation on the suction surface of the sail, and attendant drag.

The troughs and ridges of the present invention may also be used to eliminate two-dimensional streamwise boundary layer separation from the external downstream extending surface of a body having an unbounded fluid flowing thereover in the downstream direction, and which has an internal or inner downstream extending surface which forms a thin trailing edge with the external surface and surrounds a fluid flowing downstream within the body. This is best described with respect to the gas turbine engine 200 of FIG. 14.

Figure 14:
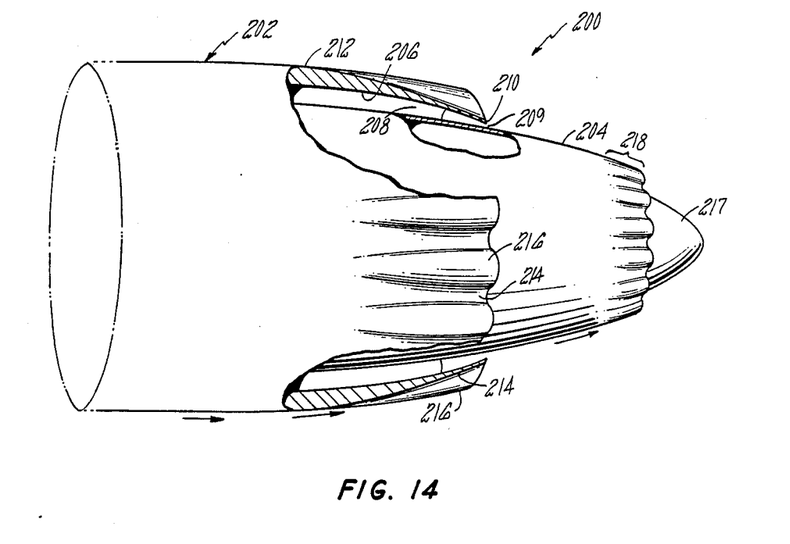
FIG. 14 is a simplified perspective view, partly broken away, of a gas turbine engine having external casings incorporating the features of the present invention.

The gas turbine engine 200 is of the fan bypass type and includes a casing or nacelle 202 surrounding and spaced from the core engine casing 204. The internal surface 206 of the nacelle 202 defines the outer surface of the fan bypass flow path 208, which has its outlet 209 at the thin, downstream or trailing edge 210 of the nacelle 202. The external surface 212 of the nacelle has a streamlined convex shape in cross section (taken in the plane of the engine axis) to reduce drag created by the external, unbounded flow of air over the surface in the downstream direction.

Initiating upstream of where separation would normally occur, a plurality of alternating, adjoining, generally U-shaped troughs 214, and ridges 216 are disposed in the external surface and extend downstream, increasing gradually in depth and height, respectively to a maximum at the outlet 209. Since the trailing edge 210 is thin, the troughs in the external surface 202 create corresponding ridges in the internal surface 206; and the ridges in the external surface create corresponding troughs in the internal surface. As hereinabove discussed in detail with respect to airfoil-shaped bodies, the troughs and ridges are sized and contoured to flow full over at least a significant portion of and preferably over their entire length, whereby streamwise two-dimensional boundary layer separation from the external surface 212 is eliminated, or its onset is at least delayed. For purposes of sizing and spacing the circumferentially spaced apart troughs and ridges using the guidelines hereinabove set forth with respect to airfoil shaped bodies, the wave amplitude M is measured radially, and the wavelength W or spacing between troughs will be an average of the radially outermost peak-to-peak arc length and the radially innermost peak-to-peak arc length.

As shown in FIG. 14, the core engine casing 204 also has an unbounded flow of fluid over its surface, which is a combination of fan bypass exhaust and ambient air. The casing 204 surrounds and is spaced radially outwardly from an engine tail plug 217 and forms part of the flowpath for the primary or core engine stream. Troughs and ridges according to the present invention are also incorporated in the trailing edge region 218 of the external surface of the casing 204 to eliminate or at least reduce or delay the onset of streamwise two-dimensional boundary layer separation.

In the embodiment of FIG. 14 the undulations formed in the casing 204 extend around the entire periphery of the outlet, and appear a as wave-shape when viewed from aft of the engine. If the engine casing had a more or less rectangular outlet, such as for an engine having a two-dimensional exhaust nozzle, all four of the sides of the casing would not need to incorporate the troughs and ridges if, for some reason, it was not practical or possible to do so. Benefits will occur over whatever portion of the casing the present invention is used.

Although this invention has been shown and described with respect to a preferred embodiment, it will be understood by those skilled in the art that various changes in the form and detail thereof may be made without departing from the spirit and scope of the claimed invention.

We claim:

1. In an airfoil shaped body having a thin trailing edge, a trailing edge region, and a pressure and a suction surface terminating at said trailing edge, and adapted to be disposed in a fluid moving downstream relative thereto at a selected operating angle of attack A which would normally result in flow separation from said suction surface, means for preventing or delaying such separation from occurring on said suction surface at such angle of attack comprising:

a plurality of alternating, adjacent troughs and ridges in said suction surface extending to said trailing edge generally along streamlines of the bulk fluid flow adjacent to the suction surface and initiating at a point upstream of any separation, but no further upstream from said trailing edge than 75% of the mean chord length of the airfoil cross section, wherein said troughs and ridges in said suction surface form, respectively, ridges and troughs in said pressure surface at least in said trailing edge region, and said thin trailing edge is wave shaped, wherein the trough contour and size along its length is selected such that streamwise two-dimensional boundary layer separation on the surface of the troughs and ridges is eliminated over substantially the full length of said troughs at said selected operating angle, said troughs and ridges being generally "U"-shaped in cross section perpendicular to their length, and blending smoothly with each other, the peak-to-peak wave amplitude M of said troughs and ridges increasing from zero at their upstream ends to a maximum amplitude at the trailing edge which is substantially greater than the 99% boundary layer thickness measured immediately upstream of said troughs, and wherein the bottom of each trough forms an angle with the adjacent bulk fluid flow direction within a range which avoids two-dimensional boundary layer separation within substantially the full length of said troughs at said angle of attack A, and wherein at the trailing edge the distance W between adjacent ridge peaks is between 0.5 and 4.0 times M.

2. The airfoil-shaped body according to claim 1, wherein said body is a gas turbine engine airfoil, and said troughs and ridges are disposed only in said trailing edge region.

3. The airfoil-shaped body according to claim 1, wherein said airfoil cross-section has a maximum thickness no more than 10% of its mean chord length, and said troughs initiate no further upstream from said trailing edge than 50% of said mean chord length.

4. The airfoil-shaped body according to claim 3, wherein said body is a gas turbine engine airfoil.

5. The airfoil-shaped body according to claim 3, wherein said body is a compressor airfoil.

6. The airfoil-shaped body according to claim 1, wherein said troughs and ridges form an undulating, smooth suction surface.

7. The airfoil-shaped body according to claim 1, wherein the peak-to-peak wave amplitude M at said trailing edge is at least what the thickness of the separation region would have been had separation occurred on the suction surface about at the upstream ends of said troughs at said operating angle of attack A.

8. The airfoil-shaped body according to claim 1, wherein the peak-to-peak wave amplitude M at said trailing edge is about twice what the thickness of the separation region would have been had separation occurred on the suction surface at about the upstream ends of said trough at said operating angle of attack A.

9. The airfoil-shaped body according to claim 3, wherein said body is a stator vane within rotating machinery.

10. The airfoil-shaped body according to claim 3, wherein said body is a rotor blade within rotating machinery.

11. The airfoil-shaped body according to claim 1, wherein said body is a sail for a sailing vessel.

12. The airfoil-shaped body according to claim 1, wherein said troughs in said suction surface each include sidewalls which converge as they approach the trailing edge to accelerate the flow therein.

13. The airfoil-shaped body according to claim 1, wherein the thickness of said body decreases towards said trailing edge along the length of said troughs and ridges.

14. The airfoil-shaped body according to claim 1, wherein each trough includes a pair of sidewalls, and wherein said sidewalls of each trough are substantially parallel to each other.

15. The airfoil-shaped body according to claim 1, wherein said body is an airfoil disposed within a conduit having wall means defining a fluid flow passage, said airfoil having opposite ends both of which are adjacent to or secured to said wall means.

16. A sail for a sailing vessel, said sail being made from non-self-supporting material which, in its raised position, is adapted to define an airfoil having a pressure and suction surface and a trailing edge, said sail including means for causing said trailing edge to take on a wave-shape when raised wherein a plurality of alternating U-shaped ridges and troughs are formed in both sides of said sail along a region of said sail immediately upstream of and including said trailing edge.

* * * * *

UNITED STATES PATENT AND TRADEMARK OFFICE
CERTIFICATE OF CORRECTION

PATENT NO.  : 4,830,315

DATED       : May 16, 1989

INVENTOR(S) : Walter M. Presz, Jr., Robert W. Paterson and Michael J. Werle

It is certified that error appears in the above-identified patent and that said Letters Patent is hereby corrected as shown below:

Move the words "flow full along their entire length." from column 8, line 7, to column 8, line 1, before the word "Further".

Signed and Sealed this

Twenty-fourth Day of April, 1990

Attest:

HARRY F. MANBECK, JR.

*Attesting Officer*     Commissioner of Patents and Trademarks